No. 791,292. PATENTED MAY 30, 1905.
J. C. RUTHERFORD.
VEHICLE WHEEL.
APPLICATION FILED JAN. 31, 1905.
2 SHEETS—SHEET 1.
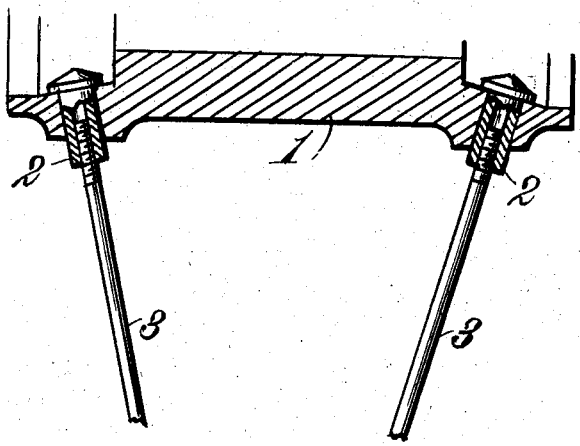
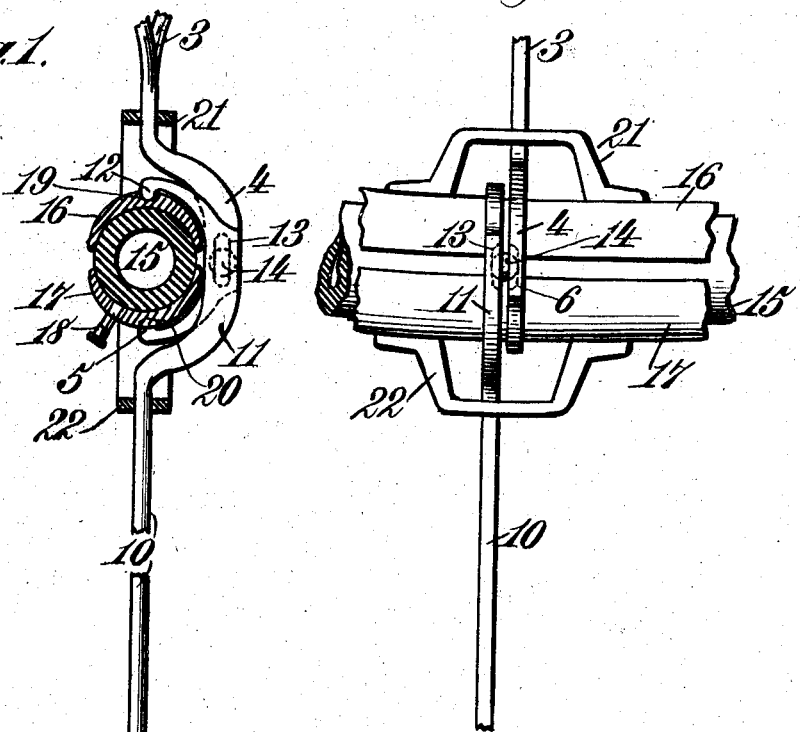
Fig. 1.  Fig. 2.
Witnesses.
Inventor:
John C. Rutherford.
By James L. Norris
Atty.

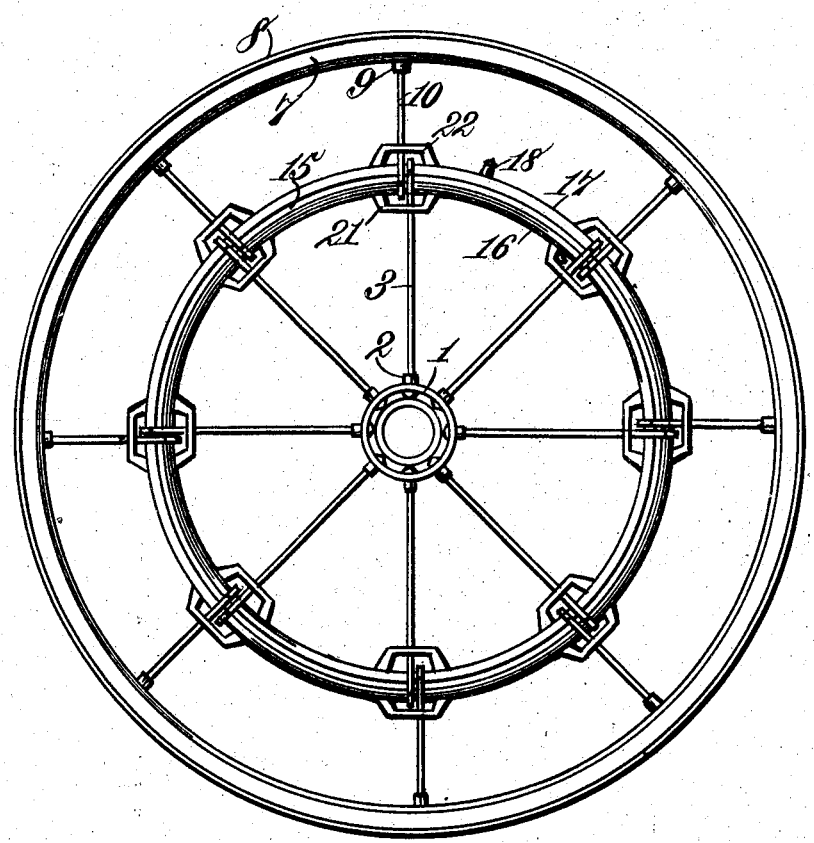

No. 791,292.

Patented May 30, 1905.

UNITED STATES PATENT OFFICE.

JOHN C. RUTHERFORD, OF PARADISE, ARIZONA TERRITORY.

VEHICLE-WHEEL.

SPECIFICATION forming part of Letters Patent No. 791,292, dated May 30, 1905.

Application filed January 31, 1905. Serial No. 243,473.

*To all whom it may concern:*

Be it known that I, JOHN C. RUTHERFORD, a citizen of the United States, residing at Paradise, in the county of Cochise, Arizona Territory, have invented new and useful Improvements in Vehicle-Wheels, of which the following is a specification.

This invention relates to vehicle-wheels more particularly adapted for use in connection with motor-cars; and the object thereof is to construct a wheel embodying all the advantages of a pneumatic or cushion wheel and which is iron-tired, as hereinafter set forth, so as to prevent the puncturing, injuring, and wearing-out of the cushion whether said cushion be a pneumatic or a solid one, such construction attaining longevity for the wheel.

The invention further aims to construct an iron-tired cushion-wheel for vehicles, more particularly motor-cars, which shall be simple in its construction, strong, durable, having a cushioning effect, efficient in its use, and comparatively inexpensive to set up.

With the foregoing and other objects in view the invention consists of the novel construction, combination, and arrangement of parts hereinafter more specifically described, and illustrated in the accompanying drawings, which form a part of this specification and wherein is shown the preferred embodiment of a vehicle-wheel constructnd in accordance with this invention; but it is to be understood that changes, variations, and modifications can be resorted to which come within the scope of the claims hereunto appended.

In the drawings, wherein like reference characters denote corresponding parts through the several views, Figure 1 is a vertical sectional view of a vehicle-wheel constructed in accordance with this invention and showing the hub portion and tire portion detached and the inner set of spokes and outer set of spokes broken away. Fig. 2 is a side elevation of a part of the wheel, and Fig. 3 is an elevation of a wheel constructed in accordance with this invention.

A wheel constructed in accordance with this invention comprises what is termed the "hub" portion, a tire portion, an inner set of spokes, an outer set of spokes, and a cushioning-section engaged and retained in position by both sets of spokes, said cushioning-section being interposed between the tire and hub portions.

Referring to the drawings by reference characters, the hub portion is indicated by the reference character 1 and is provided with a plurality of interiorly-screw-threaded sleeves 2. Only two sleeves are shown; but it will be stated that the number of sleeves 2 corresponds to the number of the spokes of the inner set. The spokes of the inner set of spokes are indicated by the reference character 3. Each of the spokes 3 is screw-threaded at its upper end and engages in its respective sleeve 2, and by such manner of connecting the spokes 2 with the hub 1 the spokes of the inner set of spokes can be tensioned when desired. The lower end of each of the spokes 3 is formed approximately semicircular, as indicated by the reference character 4, and said portion 4 terminates in an upwardly-extending retaining protuberance 5, the function of which will be hereinafter referred to. One side face of the portion 4 of the spoke 3 is provided with a recess or channel 6, the function of which will be hereinafter referred to.

The tire portion of the wheel comprises a felly 7, to which is attached a metallic tire 8, and said felly 7 carries a series of screw-threaded sleeves 9, (only one shown,) the number of said sleeves 9 corresponding to the number of the spokes of the outer set of spokes. The spokes of the outer set of spokes are indicated by the reference character 10 and have their lower ends screw-threaded, so as to engage with the sleeves 9. By such manner of connecting the spokes 10 with the felly 7 said spokes 10 can be tensioned as desired. The upper end of each of the spokes 10 is formed approximately semicircular, as at 11, said portion 11 terminating in a downwardly-extending retaining protuberance 12. One side face of the portion 11 is formed with a recess or channel, as indicated by the reference character 13, and this is arranged opposite the recess or channel 6 in the portion 4 of the spokes of the upper set of spokes. Within the recesses 6 and 13 an antifriction means 14 is arranged, which is in the form of a spherical body of any suitable material.

The cushioning-section consists of a cushioning member in the form of a pneumatic or solid tire, (as shown a pneumatic tire,) which is indicated by the reference character 15, having mounted upon the top thereof a convexed clamping member 16, and said cushioning member 15 is seated within a concaved clamping member 17, the latter having a suitable pump connection 18, communicating with the cushioning member 15, so that said cushioning member 15 can be inflated when occasion requires. If the cushioning member 15 is solid, the pump connection 18 is dispensed with. Each of the clamping members 16 and 17 conforms to the shape of the cushioning member 15—that is to say, they are of a construction similar to a wheel-rim which receives the ordinary pneumatic or solid cushioning-tire. The clamping member 16 is provided throughout its length on its upper face with a series of recesses 19, the number of said recesses 19 corresponding to the number of the downwardly-extending protuberances 12, said protuberances being adapted when the wheel is set up to engage in said recesses 19. The outer face of the clamping member 17 is also provided throughout its length with a series of recesses 20, the number of said recesses 20 corresponding to the number of the upwardly-extending protuberances 5, the latter being adapted to engage in the recesses 20 when the wheel is set up.

When the wheel is set up, the cushioning member 15 is clamped in position through the medium of the members 16 and 17, which are engaged by the protuberances 5 and 12, carried on the ends of the spokes 3 and 10, these latter being tensioned in a manner as hereinbefore set forth, such action retaining the elements which constitute the wheel together, at the same time retaining the cushioning member in proper position, but allowing the necesssary lay between the parts, so that a cushioning effect will be had.

To prevent lateral play of the spokes 3, the clamping member 16 has secured thereto a series of retaining-brackets 21, through which the spokes 3 extend, and to prevent lateral play of the spokes 10 the clamping member 17 has secured thereto a series of retaining-brackets 22, through which said spokes 10 extend.

It will be evident from the foregoing construction that when the wheel is used the wear will come upon the metallic tire 8, which is more serviceable than the ordinary pneumatic or solid-rubber tire, but at the same time, owing to the employment of the cushioning-section in the manner as set forth, the wheel embodies all the advantages of the ordinary cushion-tire.

Having thus fully described my invention, what I claim as new, and desire to secure by Letters Patent, is—

1. A vehicle-wheel involving a cushioning member, a pair of clamping members for said cushioning member, spokes provided with protuberances engaging in said clamping members for retaining them in position, and adjustable means for connecting said spokes with the hub and felly of the wheel.

2. The combination with a wheel felly and hub, of a metallic tire for said felly, an inner and an outer set of spokes, means for adjustably connecting the outer set of spokes to said felly, means for adjustably connecting said inner set of spokes to said hub, each spoke of each set of spokes provided with a protuberance, a cushioning member, a clamping member adapted to receive said cushioning member, and a clamping member mounted upon said cushioning member, said clamping members adapted to be engaged by said protuberances for retaining said cushioning member in position.

3. In a vehicle-wheel, the combination with a cushioning-section, of an inner set of spokes adapted to partly surround and engage said cushioning-section, an outer set of spokes adapted to partly surround and engage said cushioning-section, an antifriction means interposed between the said spokes, and means for connecting the said spokes to the hub and felly of the wheel, thereby retaining said cushioning-section in position.

4. In a vehicle-wheel, the combination with a cushioning-section interposed between the hub and felly, of a series of adjustable hook-shaped spokes engaging said section for retaining it in position, and antifriction means interposed between said spokes.

5. In a vehicle-wheel, the combination with the hub and tire portions thereof, of a cushioning-section interposed between said portions, adjustable means for connecting the cushioning-section with the hub, separate means for connecting the cushioning-section with the tire portion, and an antifriction means interposed between and engaging said connection means.

6. In a vehicle-wheel, the combination with the tire and hub portions thereof, of a cushioning member interposed between said portions, a pair of clamping members for said cushioning member, spokes engaging in one of said clamping members for connecting the cushioning member with the hub portion, spokes engaging in the other of said clamping members for connecting the cushioning member to the tire portion, means secured to the clamping members for preventing lateral play of the spokes, and an antifriction means interposed between and engaging with the said spokes.

7. In a vehicle-wheel, the combination with the tire and hub portions thereof, of a cushioning member interposed between said portions, a pair of clamping members for said cushioning member, adjustable spokes engaging in one of said clamping members for connecting the cushioning member with the hub portion, adjustable spokes engaging in the other of said clamping members for connecting the cushioning member to the tire portion, means secured to the clamping members for preventing lateral play of the spokes, and an antifriction means interposed between and engaging with said spokes.

8. In a vehicle-wheel, the combination with the tire and hub portions thereof, of a circular cushioning member interposed between said portions, a pair of clamping members for said cushioning member, spokes engaging in one of said clamping members for connecting the cushioning member with the hub portion, spokes engaging in the other of said clamping members for connecting the cushioning member to the tire portion, and means secured to the clamping members and adapted to be penetrated by the spokes to prevent lateral play thereof.

9. In a vehicle-wheel, the combination with the tire and hub portions thereof, of a circular cushioning member interposed between said portions, a pair of clamping members for said cushioning member, spokes engaging in one of said clamping members, means carried by the tire portion and connected with said spokes for adjustably connecting the cushioning member with the tire portion, spokes engaging in the other of said clamping members, means carried by the hub and engaging the last-mentioned spokes for adjustably connecting the cushioning portion with the hub portion, and means secured to the clamping members and adapted to prevent lateral play of the spokes, said last-mentioned means provided with an opening to permit of the passage of the spokes.

In testimony whereof I have hereunto set my hand in presence of two subscribing witnesses.

JOHN C. RUTHERFORD.

Witnesses:
  JAMES T. SHEA,
  C. H. HARPOLE.